United States Patent Office 3,014,942
Patented Dec. 26, 1961

3,014,942
METHOD FOR PRODUCING ISOCYANATES
Jean Vaganay and Aime Brulat, Sorgues, Bernard Regnault, Bouches-du-Rhone, Jacques Boileau, Sorgues, and Simone Wevert, Paris, France, assignors to The French State (Department of National Defense), Paris, France
No Drawing. Filed Nov. 9, 1956, Ser. No. 621,204
Claims priority, application France Nov. 14, 1955
9 Claims. (Cl. 260—453)

It is a well known fact that it is possible to produce isocyanates by providing for the reaction under certain conditions of phosgene with substances having at least one amine function or with amine salts inside a solvent body. When the reaction is executed inside a solvent, the boiling point of which is higher than that of the corresponding isocyanate, the separation of the isocyanate is obtained through a fractionated distillation, the isocyanate being separated as a head distillate while the heavier tailings at the lower end of the column contain all the solvent in which the impurities have collected, of which impurities some show isocyanate functions. As it is, said solvent cannot generally be reused for the production of isocyanate and the sole method used presently for its regeneration consisted hitherto in distilling it with a view to further operation. This method is however expensive all the more so that the distillation should be performed in high vacuo and that a part of the solvent is lost since it is not possible to distillate down to complete dryness without fouling the apparatus.

Our invention has for its object to cut out these drawbacks and to regenerate the exhausted solvent with a minimum cost. To this end, our invention consists in regenerating the solvent without distilling it, by means of a thermic treatment. To this end, and in conformity with our invention, when all the isocyanate has been distilled off, we continue heating at a temperature of the magnitude of 150 to 200° C. during a short time, which produces a precipitation of the impurities so that after cooling, it is sufficient for instance to proceed with a filtration or a centrifugation so as to separate the solvent containing then practically no more substances having a free isocyanate function, their proportion being in fact lower than 1%. The solvent reclaimed may then be recycled. Thus for instance, it is possible to operate when the solvent used is constituted by butyl phthalate in the case of the production of tolylene diisocyanate and similarly we may resort to octyl phthalate.

It may occur however that in certain cases, this treatment is not sufficient and that the impurities instead of being precipitated remain dissolved while increasing the viscosity of the solvent. Sometimes also, there is obtained a colloidal precipitation which finally produces a hard crust on the heated walls of the container.

According to our invention, we associate then with the thermal treatment the action produced through the addition of a small amount of an auxiliary substance adapted to produce active hydrogen reacting on the isocyanate functions remaining in the solvent. The compound substance then appearing are as a matter of fact generally but sparingly soluble in the heavy solvent that is being used and they are separated as precedingly through filtration or centrifugation while driving out furthermore if required the excess of the active hydrogen producing substances which has been initially incorporated with the mixture.

Among the auxiliary substances which may be used for this purpose, we may mention substances containing a function —OH or =NH: such as water, acids, bases, alcohols and amines; however, mineral acids and bases risk hydrolyzing the solvent and cannot therefore be recommended. Water when used alone shows on the other hand certain drawbacks in practice because it is not generally miscible with the solvent when the latter is an ester and for instance a phthalate. It is then necessary to introduce it under energetic stirring conditions so as to suitably disperse it. In contradistinction, alcohols such as methanol, ethanol, substances having an amine function such as ammonia, methylamines, aniline are satisfactory and it is even possible to use mixtures of such substances, in particular aqueous solutions, say ethanol diluted in water.

The amount of auxiliary substances to be used, depends on the amount of group —NCO to be destroyed and it is of course necessary to provide a molecular excess with reference to the number of NCO groups present in the mixture, said excess being limited by economical conditions since it is then necessary to remove this excess. Thus, it is often of interest to resort to a molecular proportion between the operative group H and the group NCO which is of the order of 200%.

The auxiliary substances used at room temperature would finally react but often only after a very long time which is prohibitive, this delay being ascribable to the low concentration of the reagents. Therefore, it is customary in practice to accelerate this reaction by heating during a few hours. It is possible for instance to heat under reflux conditions until the groups NCO have disappeared, said disappearance being detected through measuring, after which the excess of auxiliary substances is driven away through distillation and finally the remaining mixture is cooled and filtered.

It has been found that the nature of the auxiliary substances has a certain influence on the physical structure of the precipitate. In certain cases it is difficult to filter the precipitates obtained. It has been remarked furthermore that the utilisation of auxiliary substances with the addition of water leads to the formation of comparatively large precipitated particles which are easy to filter.

After filtration, the color of the solvent is often very dark. It may be used as such in most cases and be recycled several times. However, it may be of interest to improve the procedure of removal of the impurities dissolved in the solvent and to clarify the latter; this result may be obtained in accordance with our invention through the addition of active carbon or of activated earth.

The treatment of the raw solvent through active carbon or activated earth may moreover be sometimes sufficient alone without the use of any auxiliary substance according to the invention; as a matter of fact this type of treatment which is known for discoloring liquids has for its result in the particular case of our invention a considerable reduction in the proportion of residuary isocyanates for instance in the production of monoisocyanates.

The above disclosed treatment may also be executed at raised temperature; generally however this is not sufficient and it is also necessary to subject the solvent to the treatment disclosed hereinabove through an auxiliary hydrogen-producing substance. The treatment referred to may obviously be applied only to a fraction of the solvent to be recycled which fraction is thenafter mixed with a fraction of untreated solvent, the proportion being calculated so as to lower the rate of residuary NCO groups down to a value suitable for recycling.

The following examples given by way of exemplification and by no means in a binding sense are intended to illustrate the method.

*Example 1*

The bottom of the vat is filled with 180 g. of butyl phthalate and 240 g. of phosgene. We pour into it a solution of 122 g. of tolylene diamine in 596 g. of butyl phthalate at a temperature between 0 and +5° C. The mixture is then heated to 85° C., 120 g. of phosgene are poured into it, following which nitrogen at a temperature of 115 to 125° C. is caused to bubble through said mixture during two hours so as to ensure the evolution of the gases and the mixture is finally distilled in vacuo, the temperature of the flask being brought gradually from 140 to 185° C. At the end of the distillation, there is formed a precipitate which thickens more and more. This distillation is stopped as soon as the distillate weighs 450 g., the residual liquid weighing 480 g. After filtration, we obtain a precipitate weighing 15 g. after drying. The filtrate contains still 0.85% of NCO groups. The filtrate is then heated during one hour and 30 minutes at a temperature of 180 to 200° C. and a precipitate is formed which thickens during the heating; the weight obtained is 17 g. and the filtrate contains now only 0.2% of NCO groups.

This butyl phthalate the acidity of which is zero has been recycled twice for the execution of two further successive operations followed by the same treatment with a filtration; the contents of NCO groups after treatment have dropped down to 0.2 to 0.4%.

Example 2

A similar operation is executed with ethyl phthalate as a solvent instead of butyl phthalate. After distilling off the isocyanate, the tailings contain phthalate incorporating 2% of NCO groups.

To 100 grams of said phthalate we add 2.5 g. of aniline.

We then stir during one hour without heating and the proportion of NCO sinks down to 0.66%.

We stir then again during one hour at 70° C. and the proportion sinks further down to 0.42%.

We stir during one further hour at 120° C. and the proportion sinks down to 0.12%.

We finally stir during one hour at 150° C. and the proportion falls to 0%.

When heating directly 100 g. of phthalate during one hour at 150° C. with 2.5 grams of aniline without passing through the above intermediate stages we obtain after cooling and filtering a solvent containing 0% of isocyanate and which remains clear even after several weeks.

Example 3

The ethyl phthalate recovered in the production of tolylene diisocyanate has been retreated in accordance with the method described hereinabove. Said phthalate contains about 4% of NCO groups.

Inside a boiler of 220 litres, we load 200 kg. of said phthalate together with 10 kg. of ethanol containing 50% of water. We heat during one hour under reflux conditions and we distil first the alcohol under atmospheric pressure and then the water after which we heat in vacuo under 60 mm. of mercury at 140° C. during one hour so as to remove the last traces of water. The remaining liquid is cooled and filtered and the phthalate now contains only between 0 and 0.04% of NCO groups.

The filtration is more difficult and the precipitate is finer when absolute ethanol is used under the same conditions.

Example 4

A regenerating treatment of the ethyl phthalate recovered in the production of tolylene diisocyanate may be executed as follows: Inside a mixer containing 350 litres, we load 250 kg. of phthalate to be purified, 2.5 kg. of bleaching black, 5 kg. of activated earth sold under the trade name Clarsil LE 1. We keep the mixture during one hour at 90° C. while stirring energetically after which the liquid is filtered at raised temperature through a filter press.

Contents of NCO groups before treatment 1.4% and after treatment 0.3%.

The color changes from dark reddish brown to light straw yellow.

Obviously many modifications may be brought to the method disclosed without widening the scope of the invention as defined in the accompanying claims.

What we claim is:

1. In the method for producing isocyanates by the reaction of phosgene with a member selected from the group consisting of an amine and an amine salt in an alkyl phthalate solvent wherein the alkyl radical is selected from the group consisting of ethyl, butyl, and octyl radicals, the improvement for purifying said solvent, comprising distilling off from said alkyl phthalate solvent the isocyanates formed by said reaction, heating the remaining solvent to a temperature within the range of 150–200° C. to precipitate the impurities contained in said solvent, and separating the precipitated impurities from said solvent.

2. In the method for producing isocyanates by the reaction of phosgene with tolylene diamine in an alkyl phthalate solvent wherein the alkyl radical is selected from the group consisting of ethyl, butyl, and octyl radicals, the improvement for purifying said solvent comprising distilling off from said alkyl phthalate solvent the isocyanates formed by said reaction, heating the remaining solvent to a temperature within the range of 150–200° C. to precipitate the impurities contained in said solvent, and separating the precipitated impurities from said solvent.

3. The method as defined in claim 2 wherein said alkyl phthalate is ethyl phthalate.

4. The method as defined in claim 2 wherein said alkyl phthalate is butyl phthalate.

5. The method as defined in claim 2 wherein said alkyl phthalate is octyl phthalate.

6. In the method for producing isocyanates by the reaction of phosgene with a member selected from the group consisting of an amine and an amine salt in an alkyl phthalate solvent wherein the alkyl radical is selected from the group consisting of ethyl, butyl, and octyl radicals, the improvement for purifying said solvent comprising distilling off from said solvent the isocyanates formed by said reaction, adding to the remaining solvent containing impurities having NCO groups a compound which will produce an active hydrogen and which is selected from the group consisting of water, ammonia, methylamine, aniline, methanol, ethanol and mixtures thereof, said compound being present in an amount in molecular excess with reference to the number of NCO groups present in the solvent, heating the solvent to a temperature of 150–200° C. to precipitate the impurities contained in said solvent, distilling off the excess compound from said solvent, and separating the precipitated impurities from said solvent.

7. In the method for producing isocyanates by the reaction of phosgene with tolylene diamine in an alkyl phthalate solvent wherein the alkyl radical is selected from the group consisting of ethyl, butyl, and octyl radicals, the improvement for purifying said solvent comprising distilling off from said alkyl phthalate solvent the isocyanates formed by said reaction, adding to the remaining solvent containing impurities having NCO groups a compound which will produce an active hydrogen and which is selected from the group consisting of water, ammonia, methylamine, aniline, methanol, ethanol and mixtures thereof, said compound being present in an amount of about 200% molecular excess with reference to the number of NCO groups present in the solvent, heating the solvent to a temperature of 150–200° C. to precipitate the impurities contained in said solvent, distilling off the excess compound from said solvent, and separating precipitated impurities from said solvent.

8. The method as defined in claim 7 wherein said alkyl phthalate is ethyl phthalate and said compound is aniline.

9. The method as defined in claim 7 wherein said alkyl phthalate is ethyl phthalate and said compound is ethanol.

References Cited in the file of this patent

UNITED STATES PATENTS

| | | |
|---|---|---|
| 1,989,699 | Kyrides | Feb. 5, 1935 |
| 2,326,501 | Siefken et al. | Aug. 10, 1943 |
| 2,580,468 | Schaefer et al. | Jan. 1, 1952 |
| 2,642,449 | Moringstar et al. | June 16, 1953 |
| 2,778,849 | Ackelsberg | Jan. 22, 1957 |